(12) United States Patent
Andrews et al.

(10) Patent No.: US 7,959,837 B2
(45) Date of Patent: *Jun. 14, 2011

(54) METHOD OF COMPACTING MATERIAL

(75) Inventors: Albert A. Andrews, Cleveland, TN (US); Robert D. Freeman, Hixson, TN (US); Otis Neil Taylor, Cleveland, TN (US); David Leon Watson, Riceville, TN (US); Eric V. Ball, Ocoee, TN (US)

(73) Assignee: The Gillette Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/384,133

(22) Filed: Apr. 1, 2009

(65) Prior Publication Data

US 2010/0252948 A1 Oct. 7, 2010

(51) Int. Cl.
- *B27N 3/02* (2006.01)
- *B29C 43/08* (2006.01)
- *B30B 11/10* (2006.01)

(52) U.S. Cl. ........ 264/109; 264/112; 425/354; 425/355; 425/411; 425/47; 419/5

(58) Field of Classification Search .............. 264/109, 264/112; 425/354, 355, 406, 411, DIG. 47, 425/345, 218, 78; 419/5
See application file for complete search history.

(56) References Cited

U.S. PATENT DOCUMENTS

| | | | | |
|---|---|---|---|---|
| 1,863,854 A | * | 6/1932 | Jeffery | 264/102 |
| 2,594,956 A | | 4/1952 | Marshall | |
| 4,147,489 A | * | 4/1979 | Milburn et al. | 425/355 |
| 4,298,563 A | * | 11/1981 | DeSantis et al. | 419/38 |
| 4,302,412 A | * | 11/1981 | DeSantis | 264/109 |
| 4,450,127 A | * | 5/1984 | DeSantis et al. | 264/603 |
| 4,573,895 A | * | 3/1986 | DeSantis et al. | 425/78 |
| 4,921,419 A | * | 5/1990 | Brussel | 425/406 |
| 4,954,068 A | * | 9/1990 | Brussel | 425/406 |

(Continued)

FOREIGN PATENT DOCUMENTS

DE 654479 12/1937

(Continued)

OTHER PUBLICATIONS

PCT International Search Report, date mailed: Jun. 10, 2010, 3 pages.

*Primary Examiner* — Joseph S Del Sole
*Assistant Examiner* — Nahida Sultana
(74) *Attorney, Agent, or Firm* — Vladimir Vitenberg; Kevin Charles Johnson (57) ABSTRACT

A method of compacting material such as but not limited to cathode material for electrochemical cells. A mixture is inserted into a die cavity and the mixture is compacted into a disk shape by the action of a first plunger pressing down on the material and a second plunger pressing upwardly on the material. Flashing of material during ejection of the disk from the die is prevented by fitting a polymeric sleeve around the outer surface of the first plunger. The sleeve flexes to bulge outwardly and does not enter the die cavity during compaction of material and returns to its original position during ejection of the compacted disk from the die. Contact between the disk and sleeve prevents flashing during ejection. Alternatively, a polymeric seal ring is placed around the outer surface of the first plunger. The disk presses against the seal ring preventing flashing of material during ejection.

14 Claims, 6 Drawing Sheets

U.S. PATENT DOCUMENTS

| | | | |
|---|---|---|---|
| 5,071,607 A * | 12/1991 | Ayer et al. | 264/112 |
| 6,558,594 B2 * | 5/2003 | Kouda et al. | 264/105 |
| 6,869,250 B2 | 3/2005 | Moyna | |
| 7,033,156 B2 * | 4/2006 | Gakovic | 425/78 |
| 7,153,118 B2 * | 12/2006 | Trebbi et al. | 425/107 |
| 7,156,631 B2 * | 1/2007 | Ozeki | 425/78 |
| 7,247,013 B2 | 7/2007 | Roland | |
| 7,368,075 B2 * | 5/2008 | Olsson | 264/109 |
| 7,641,465 B2 * | 1/2010 | Meissner et al. | 425/345 |
| 2002/0024160 A1 * | 2/2002 | Sugimoto | 264/12 |
| 2004/0191347 A1 * | 9/2004 | Boeckx et al. | 425/193 |
| 2005/0189672 A1 * | 9/2005 | Olsson | 264/109 |
| 2005/0220921 A1 * | 10/2005 | Olsson | 425/352 |
| 2010/0028478 A1 * | 2/2010 | Baltruschat et al. | 425/170 |

FOREIGN PATENT DOCUMENTS

| | | |
|---|---|---|
| EP | 0842762 | 5/1998 |
| JP | 52059818 | 5/1977 |

* cited by examiner

METHOD OF COMPACTING MATERIAL

FIELD OF THE INVENTION

This invention relates to a method of forming compacted disks, as by compacting cathode material into disk shape. The invention relates to an improved method of compacting material into disk shape.

BACKGROUND OF THE INVENTION

Primary alkaline electrochemical cells typically have an anode comprising zinc active material, an alkaline electrolyte, a cathode comprising manganese dioxide active material, and an electrolyte permeable separator film, typically of cellulose or cellulosic and polyvinylalcohol fibers, between anode and cathode. Such cell may be designated a $Zn/MnO_2$ cell. The cathode may also contain nickel oxyhydroxide (NiOOH) active material in place of manganese dioxide or in admixture with manganese dioxide. Such cell containing predominantly nickel oxyhydroxide as the cathode active material, may be designated a Zn/NiOOH cell. The alkaline cell casing typically has a cylindrical shape, for example, commonly available in standard cell sizes AAAA (42×8 mm), AAA (44×9 mm), AA (49×12 mm), C (49×25 mm) and D (58×32 mm) size.

In the $Zn/MnO_2$ cell the cathode typically comprises a mixture of manganese dioxide, graphite, alkaline electrolyte normally aqueous potassium hydroxide, and optionally a small amount of binder material, such as polyethylene binder. The manganese dioxide used in the cathode is preferably electrolytic manganese dioxide (EMD) which is made by direct electrolysis of a bath of manganese sulfate and sulfuric acid. The EMD is desirable since it has a high density and high purity. The electrical conductivity of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3 \times 10^{-3}$ ohm-cm and $4 \times 10^{-3}$ ohm-cm.

Alkaline cell cathode for cylindrical shaped cells are normally formed in the shape of disks having a hollow central core. (The term cathode disks as used herein may also be referenced as cathode pellets or tablets.) The top and bottom surfaces of the disk are flat with cylindrical surface therebetween. A plurality of the disks are typically inserted into the cell casing and stacked one on top of the other, for example, as shown in representative U.S. Pat. No. 6,251,539 B1 for $Zn/MnO_2$ cells and in U.S. Pat. No. 7,273,680 B2 for Zn/NiOOH cells. The hollow central core of the disks, are bounded by the cathode disk inside surface running along the disk's central longitudinal axis. The cathode disk's inside surface is typically of cylindrical shape, but may also be other curvilinear shape either regular or irregular, for example, as shown in U.S. Pat. No. 6,514,637 B2. After the cathode disks are inserted into the cell casing a separator sheet is inserted to line the inside surface of cathode disks, that is, to line the disks' hollow core. Zinc anode material is then supplied, typically in the form of a gelled zinc slurry, to fill the hollow core of the cathode. For example, the zinc particles can be admixed with conventional gelling agents, such as sodium carboxymethyl cellulose or the sodium salt of an acrylic acid copolymer, and alkaline electrolyte, normally aqueous potassium hydroxide. The gelling agent serves to suspend the zinc particles and to maintain them in contact with one another. Thus, the filled cell has cathode in electrical contact with the casing housing. An elongated current collector is normally inserted into the anode material. The elongated current collector is in electrical contact with and end cap assembly (insulated from the cell casing). The end cap assembly is crimped over the cell casing to close the cell as shown, for example, in the above cited references U.S. Pat. Nos. 6,251, 539 and 7,273,680.

The cathode disks are made by inserting the cathode mixture into a die cavity and activating a punch assembly to compress the cathode mixture while in the die cavity. The cathode mixture may be compacted between an upper punch (first punch) and a lower punch (second punch) which form a part of the punch assembly. In the compaction process the upper punch presses down onto the surface of the cathode mixture while the lower punch moves upwards or remains stationary. The compacted cathode disks are ejected from the die by action of a lower plunger which presses upwards onto the disk's bottom surface, thereby lifting the disk out of the die.

A longstanding problem associated with forming such cathode disks for alkaline cells is that as the disk is being ejected from the die, flashing of cathode material tends to form in the small clearance space between the cathode disk and die cavity wall and upper punch. In particular flashing of cathode material can become more pronounced when the upper punch tip's edge wears. As the upper punch tip edge wears the clearance between the punch and the die cavity wall increases. Such increase in clearance creates a void space between disk and die cavity wall which can result in flashing of cathode material as the compacted cathode is being ejected from the die. Such flashing of cathode material causes a thin web or wing of cathode material to attach to and protrude from the disk's top surface and top edge of the disk's outer surface. Such web of material is shown as flashed material 55 and 55a protruding from the top of formed cathode disk 50 in FIG. 10. This results in an uneven or nonuniform top edge of the cathode disk and therefore must be removed before the disk is inserted into the cell.

Moreover, such flashed material breaks off in parts as the cathode disk is being ejected from the die and conveyed and transported to receiving containers. This causes an atmosphere of cathode dust to accumulate in the vicinity of the compaction process. As a safety protection workers may need to wear protected respiratory masks. The dust contains abrasive cathode material which may gradually collect on the surfaces of the punch assembly and peripheral operating equipment causing equipment contamination.

Accordingly, it is desired to improve the method of forming cathode disks for alkaline cells in order to eliminate or else significantly reduce the amount of flashed material which becomes attached to the cathode disk during the disk's formation and compaction.

It is desired to reduce the amount of cathode dust in the atmosphere surrounding the cathode compaction process and compaction of other materials thereby improving air quality in the work environment.

SUMMARY OF THE INVENTION

The invention is directed to a method of forming and compacting cathode mixture into cathode disks for insertion into cylindrical casing of alkaline cells. (Cathode disks are also referenced in the art as cathode pellets or tablets.) Cathode mixtures comprising manganese dioxide, graphite, alkaline electrolyte normally aqueous potassium hydroxide, and optionally a small amount of binder material, such as polyethylene binder are formed. The cathode mixture may also contain nickel oxyhydroxide (NiOOH) active material in place of manganese dioxide or in mixture with manganese dioxide. The cathode mixture is inserted into an elongated cavity (die cavity) running through a die. (The term "die" as used herein is equivalent to a housing having a cavity therein). The die is preferably of ceramic material. A punch assembly is employed to compress the cathode mixture into a disk shape while the cathode mixture is in the die cavity. The punch assembly comprises an upper punch (first punch), a lower punch (second punch) and a core rod, all of which may be independently moved in desired synchronized step. The upper punch, lower punch and core rod are elongated, typically cylindrically shaped members composed of steel, preferably of high carbon tool steel. The upper punch, lower punch, and die cavity typically have common central longitudinal axis. The upper punch and lower punch typically have a hollow core into which the core rod may penetrate in order to form a hollow central core of the cathode disk as it is being compacted. The cathode mixture is compacted between upper and lower punch tip surfaces The cathode mixture is inserted into the die cavity so that it is between the tip surface of the upper punch and lower punch. In the compaction process the upper punch tip surface enters the die cavity and presses down onto the surface of the cathode mixture while the lower punch moves upwards within the die cavity or remains stationary. A compacted cathode disk is formed as the cathode material is compressed between the upper punch tip surface and the lower punch tip surface. The compacted cathode material is formed around a core rod resulting in a compacted cathode disk having a hollow central core as in a disk shaped donut. The top and bottom surfaces of the compacted cathode disk are flat and uniform with a hollow core surrounding the disk's central longitudinal axis. The compacted cathode disks are ejected from the die cavity by action of a lower plunger which presses upwards onto the disk's bottom surface, thereby lifting the disk out of the die while the upper punch lifts away from the die. The cathode disks may be shaped into required size for insertion in standard cylindrical casing for alkaline cells, for example, AAAA (42×8 mm), AAA (44×9 mm), AA (49×12 mm), C (49×25 mm) and D (58×32 mm) size cells. The cathode disks are typically inserted into the cell casing by stacking a plurality of such disks one onto the other. Such alkaline cells typically have an anode material comprising a zinc slurry which is inserted into the central core of the cathode disks with separator sheet placed in position between the anode and cathode material.

In the method of the invention the cathode disks are formed and compacted in the die in a manner which eliminates or greatly reduces the chance of forming flashed cathode material. Such flashed material can form a web of cathode material which can attach to the top surface or top edge of the compacted disks as they are being ejected from the die. As described in the preceding background the formation of such flashed material has been a long standing problem associated with the compaction of cathode disks. The formation of such flashed material is undesirable, since it becomes attached to the cathode disk and easily breaks off in parts as the cathode disk is ejected from the die and conveyed and transported to receiving containers. This causes an atmosphere of cathode dust to accumulate in the vicinity of the compaction process requiring workers to wear protected respiratory masks, and such dust can eventually clog the punch assembly resulting in the need for more frequent maintenance.

In one aspect the method of the invention has solved this long standing problem by providing the upper punch (first punch) with a resilient, flexible sleeve, termed herein as a deflasher sleeve. The deflasher sleeve is slipped over and around the lower body surface of the upper punch adjacent the punch tip surface. The deflasher sleeve is desirably of a resilient, durable elastomeric material or a thermoplastic material which also exhibit some elastomeric properties. A preferred material for the deflasher sleeve is polyurethane. In its original or starting position, the deflasher sleeve fits circumferentially flush against the upper punch surface thereby contacting and hugging the upper punch outer surface. However, the sleeve has the ability to compress causing a major portion of the sleeve (middle portion) to flex and bulge outward from the upper punch outer surface as the sleeve presses against the die table (die top surface). This occurs just as the upper punch penetrates into the die cavity and just before the upper punch tip surface presses onto the cathode mixture. No portion of the deflasher sleeve enters the die cavity as the upper punch presses onto the cathode mixture or at any other time during the process. Instead the deflasher sleeve contacts the die only at the die table (die top surface) without entering the die cavity. After the cathode disk has been compacted within the die cavity the upper die lifts upwards causing the deflasher sleeve to reflex to its original position lying flush against and hugging the outer surface of the upper punch. As the lower punch moves upwards to eject the compacted cathode disk from the die cavity the top surface or top outer edge of the compacted disk impinges against the deflasher sleeve just as the sleeve has reflexed back to its original position. The impingement of the cathode disk against the resilient deflasher sleeve prevents the formation of flashed material from forming and attaching to the upper surface of the compacted disk as the disk is being ejected from the die. Although the deflasher sleeve formed of polyurethane material appears to work best in preventing deflashing of cathode material, it will be appreciated that other material having similar resiliency, durability, and particle abrasion resistant properties may also be suitable in place of polyurethane. Thus, the invention is not intended to be limited to use of polyurethane material for the deflasher sleeve.

In another aspect of the invention the lower end of the upper punch (first punch) outer surface may be over molded with a seal ring composed of resilient, durable polymer, preferably polyurethane. The seal ring thus lies circumferentially flush around the outer surface of the upper punch at the lower end of the upper punch. The resilient polymer, preferably polyurethane, is molded circumferentially over a portion of the upper punch outer surface adjacent to but not contacting the punch tip surface. Thus, a ring of molded polymer, preferably of polyurethane, is formed around the lower end of the upper punch forming thereby a seal ring. Preferably, a plurality of apertures, typically round apertures, are formed along a circumferential path in the upper punch outer surface before the seal ring of polyurethane or equivalent polymer is molded onto the upper punch surface. In this case the apertures will underlie the polyurethane ring as this polymer is molded over the upper punch body surface. Such apertures underlying the seal ring serve to hold or anchor the molded polymer ring to the upper punch surface. The apertures also provide compression space into which the overlying portions of the seal ring may be compressed as contact pressure is applied to the seal ring.

In application of the seal ring in the compaction method of the invention, the cathode mixture is first inserted into the die cavity so that it rests on the tip surface of the lower punch (second punch). The lower punch may be held stationary (or else move upwards) as the upper punch (first punch) moves downwards into the die cavity to compact the cathode mixture. As the upper punch moves downwards into the die cavity to compact the cathode disk against the lower punch tip surface, at least a portion of the seal ring squeezes into the die cavity entrance. After the cathode mixture is compacted into a disk shape, the lower punch pushes upwards to eject the compacted cathode from the die. However, the seal ring provides a tight seal at the entrance of the die cavity immediately above the cathode disk while the disk is still in the die cavity. The cathode disk presses against the seal ring just as the disk is being ejected from the die, but while at least a portion of the seal ring is still within the die cavity. The pressing action between the cathode disk and seal ring while at least a portion of the seal ring is still in the die cavity, prevents cathode material from flashing and attaching to the disk surface as the disk is being ejected from the die. Polyurethane is a preferred material for the seal ring but other elastomeric polymer having similar property of resiliency, durability, and particle abrasion resistance may also be suitable. For example, any durable elastomeric material such as vulcanized rubber, styrene butadiene (SBR) rubber, or silicone rubber and similar materials may be suitable substitute material for polyurethane for the seal ring composition. Thus, the invention is not intended to be limited to use of polyurethane material for the seal ring.

The compacted disk shape is typically cylindrical (coin shape), having opposing parallel flat top and bottom surfaces with integral cylindrical body surface therebetween. However, the method of the invention is not intended to be limited to forming such regular shaped disks. The compacted disk may be of other shape or configuration. For example, the compacted disk formed by the method of the invention may have regular or irregular shaped circumferential edges. Thus, the disk's circumferential edge may be formed of straight or curvilinear surfaces or a portion of the circumferential edge may be straight and another portion may be curvilinear.

The method of the invention and improvements herein described can be applied to compaction of other materials. The invention is therefore not intended to be limited to compaction of cathode material for batteries. The application of the method of the invention and improvements herein described can be applied to other compaction processes. For example, the invention can be applied to compacting pharmaceutical powders or other types of cakes or pellets which may be compacted. The constituents for such cakes or powders may be of differing chemical composition. The invention and improvements herein described can be beneficially applied to compacting various materials, for example, but not limited to, compacting pharmaceutical powders or other materials wherein powder or particulate matter or chemical compositions must be compacted into varying shapes or configurations.

DETAILED DESCRIPTION

A representative cathode mixture 50 for an alkaline cell is prepared. The cathode mixture 50 is intended to be compacted into cathode disks, typically cylindrical shaped disks having a hollow core, for insertion into a cell casing. The compacted cathode disks may be inserted, for example, in a conventional cylindrical alkaline cell having an anode comprising zinc, as referenced hereinabove and in representative U.S. Pat. No. 6,251,539 B1. The intended use of the compacted cathode disks may be, for insertion in standard size cylindrical casing for alkaline cells, for example, AAAA (42×8 mm), AAA (44×9 mm), AA (49×12 mm), C (49×25 mm) and D (58×32 mm) size cells.

A representative cathode mixture 50 comprises manganese dioxide (EMD) and a conductive carbon, preferably, graphitic material, desirably a flaky crystalline natural graphite or expanded graphite or mixture thereof. Cathode mixture may also include graphitic carbon fibers or graphitic carbon nanofiber. The total conductive carbon in the cathode mixture desirably comprises between about 2 and 10 percent by weight of the cathode, preferably between about 2 and 8 percent by weight of the cathode. The cathode mixture also desirably comprises between about 5 and 10 percent by weight of an aqueous solution of KOH, which preferably has a strength of between about 7 and 10 Normal (30 and 40 wt. % KOH and 2 wt. % ZnO).

The cathode active material, typically comprising manganese dioxide (EMD), comprises between about 80 and 92 percent by weight of the cathode mixture, preferably between about 80 and 90 percent by weight of the cathode mixture. The cathode disk 50 (FIG. 11) formed by the method of the invention can desirably have the following composition: 87-93 wt % of electrolytic manganese dioxide (e.g., Trona D from Kerr-McGee), 2-6 wt % (total) of graphite, 5-7 wt % of a 7-10 Normal aqueous KOH solution having a KOH concentration of about 30-40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The term "graphite" or "graphitic material" as used herein shall include natural and synthetic crystalline graphites (synthetically prepared or processed graphite), expanded graphites, graphitic carbons, and graphitic carbon fibers. The natural or expanded graphite is preferably in particulate form having a mean average particle size desirably between about 0.5 micron and 50 micron, typically between about 10 micron and 50 micron. A graphitic carbon has the characteristics of an ordered three-dimensional graphite crystalline structure consisting of layers of hexagonally arranged carbon atoms stacked parallel to each other as determined by X-ray diffraction. As defined in International Committee for Characterization and Terminology of Carbon (ICCTC, 1982), published in the *Journal Carbon*, Vol. 20, p. 445, a graphitic carbon embraces the varieties of substances consisting of elemental carbon in allotropic form of graphite irrespective of structural defects. The term graphitic carbon as used herein shall be construed in this manner.

Figure 1:
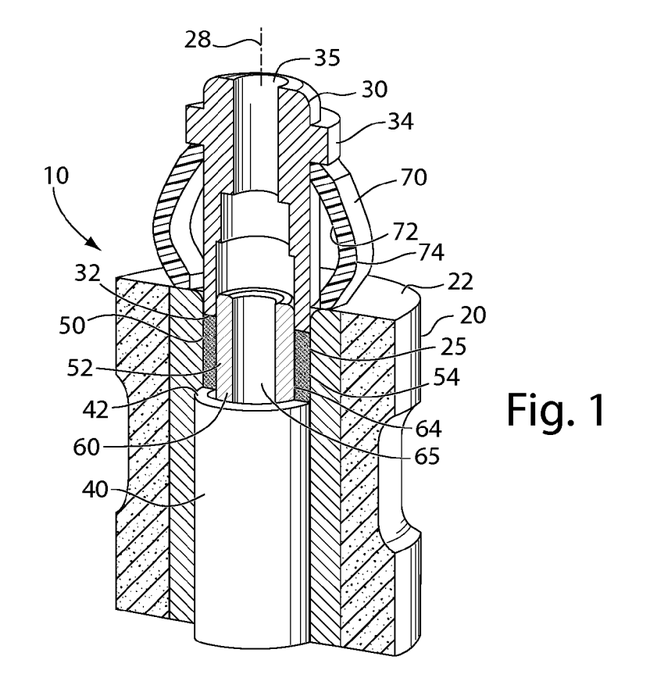
FIG. 1 is a cross sectional view of the of a first embodiment of the punch assembly showing the deflasher sleeve in compressed, flexed position as the cathode material is being compacted into a disk.
Figure 2:
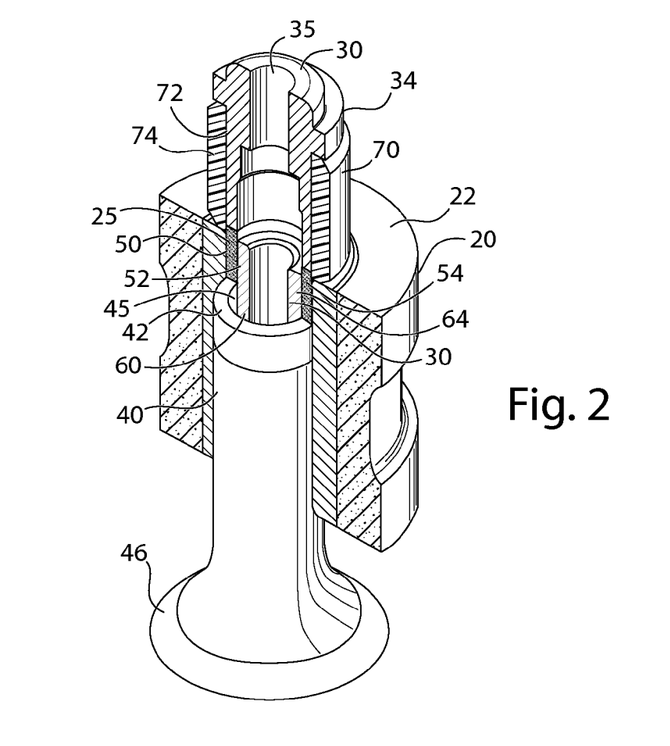
FIG. 2 is a cross sectional view of the punch assembly showing the deflasher sleeve in reflexed position lying flush against the outer surface of the upper punch as the compacted cathode disk is being ejected from the die.
Figure 4:
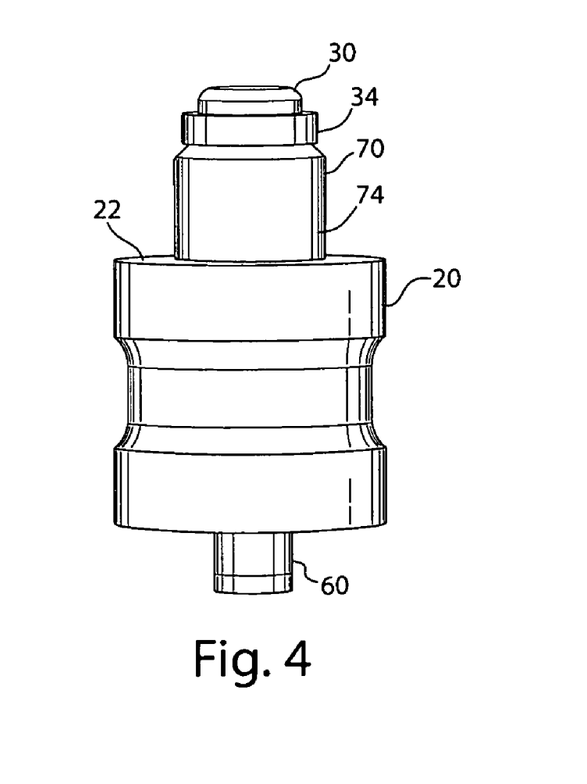
FIG. 4 is a pictorial view of the deflasher sleeve in original or reflexed position lying flush against the outer surface of the upper punch.
Figure 5:
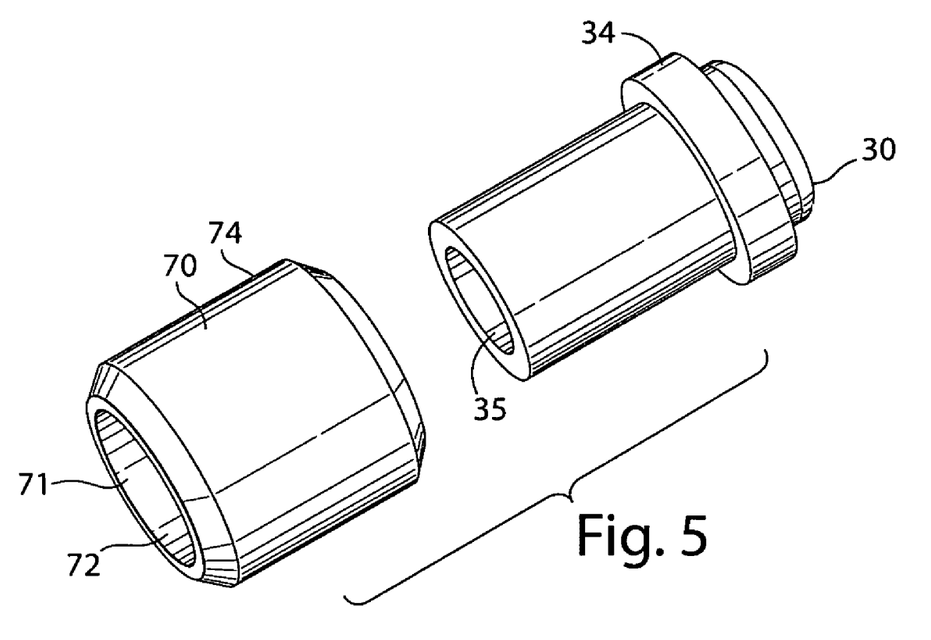
FIG. 5 is an exploded view of the upper punch and deflasher sleeve.
Figure 6:
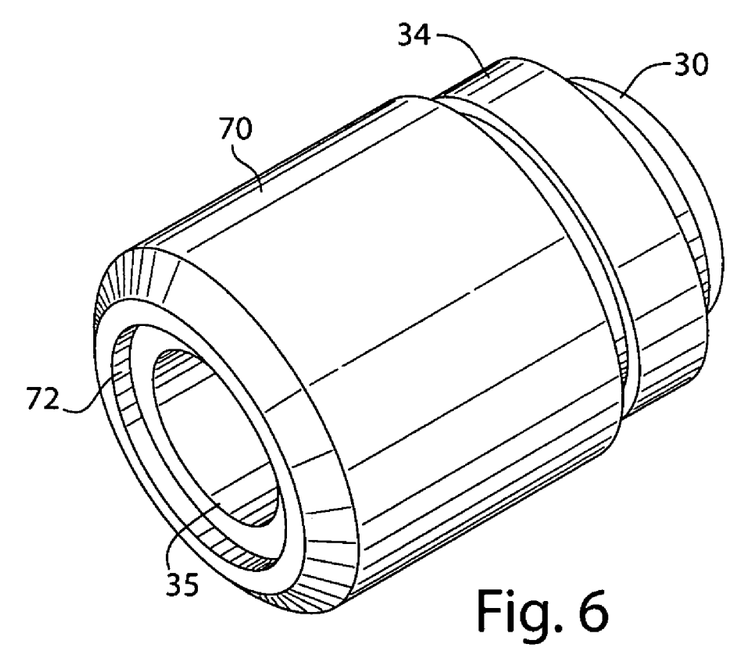
FIG. 6 is a pictorial view of the deflasher sleeve inserted over the lower body surface of the upper punch.
Figure 11:
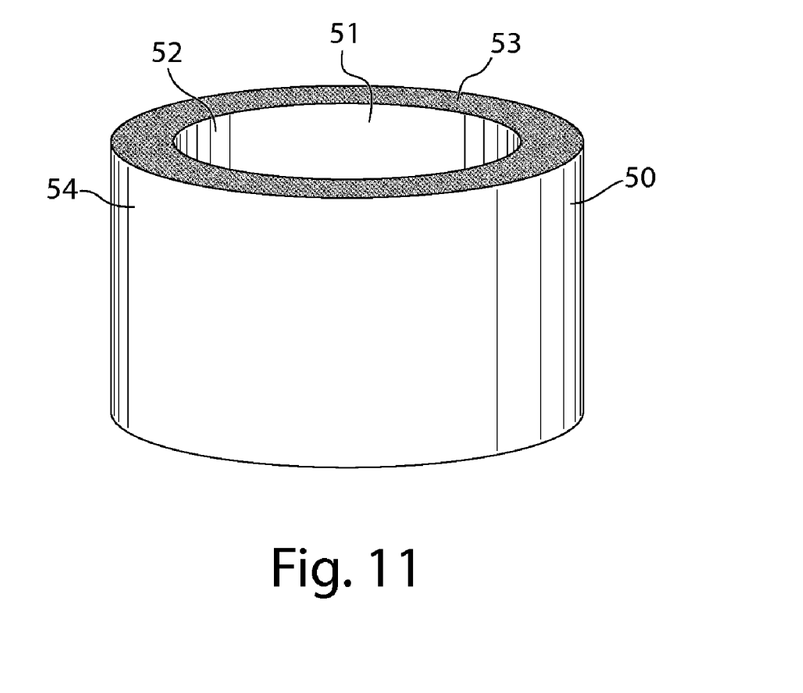
FIG. 11 is a schematic pictorial representation showing a compacted cathode disk without flashed cathode material attached thereto as a result of employing either the deflasher sleeve as in FIG. 1 or the seal ring as in FIG. 7.

In one specific embodiment the representative cathode mixture 50 may be inserted into die assembly 10 (FIG. 1) to be compacted into a cathode disk 50 (FIG. 11). Compacted disk 50 has an outer surface 54 and an inner surface 52 defining a central hollow core 51 (FIG. 11). The die assembly 10 (FIGS. 1 and 2) has die 20 with die cavity 25 therein, an elongated upper punch (first punch) 30, an elongated lower punch (second punch) 40, and a core rod 60 which moves within the hollow core 45 of lower punch 40. The upper punch 30 is an elongated cylindrical member having a hollow core 35. Similarly lower punch 40 is an elongated cylindrical member having a hollow core 45 (FIG. 2). Core rod 65 may also have a hollow core 65. Lower punch 40 is integrally connected to base 46 (FIG. 2). The die cavity 25, upper punch 30, lower punch 40, and core rod 60 all have common central longitudinal axis 28 (FIG. 1). Upper punch 30 and lower punch 40 moves within die cavity 65. The upper punch 30 and lower punch 40 are formed of high carbon steel desirably tool grade steel. Die 20 is formed preferably of ceramic material. The upper punch 30 is fitted with a deflasher sleeve 70 of resilient, durable, polymeric material (FIG. 6). Deflasher sleeve 70 desirably has elastomeric properties and may be of thermoplastic material having elastomeric properties. Preferably sleeve 70 is of polyurethane material, but it will be appreciated that other elastomeric materials having similar durability and elastomeric properties could be employed in place of the polyurethane. A preferred polyurethane for sleeve 70 is available as polyester-85A polyurethane available from Parkway Products. Deflasher sleeve 70 is of a cylindrical shape having a cylindrical outer surface 74 and hollow core 71 defined by inner surface 72 (FIG. 5). In the position shown in FIGS. 5 and 6 the deflasher sleeve 70 is in its original position flush against the outer surface of upper punch 30 so that it contacts and hugs the outer surface of upper punch 30 as shown in FIGS. 2, 4, and 6. The cathode compaction method of the invention employing the die assembly 10 shown in FIGS. 1 and 2 is as follows:

Initially the upper punch 30 (FIG. 1) is moved upwards so that upper punch tip 32 is above die table (die top surface) 22. The cathode mixture 50 is inserted into die cavity 25 so that the mixture lodges against tip surface 42 of lower punch 40.

The cathode mixture 50 is thus initially held in place in die cavity 25 by lower punch tip surface 42, core rod 60 outer surface 64, and the wall surface of cavity 25. Upper punch 30, lower punch 40, and core rod 60 have independent movement, and may be moved up or down in synchronized manner. With reference to the punch assembly 10 shown in FIGS. 1 and 2 the cathode mixture 50 is compacted by action of upper punch 30 stroking downward on cathode mixture 50 as lower punch 40 remains stationary or moves upwards in synchronized timing with the downward movement of upper punch 30. Core rod 60 (FIGS. 1 and 2) may slide independently to form and maintain the cathode disk hollow core 51 shown best in FIG. 11.

Figure 3:
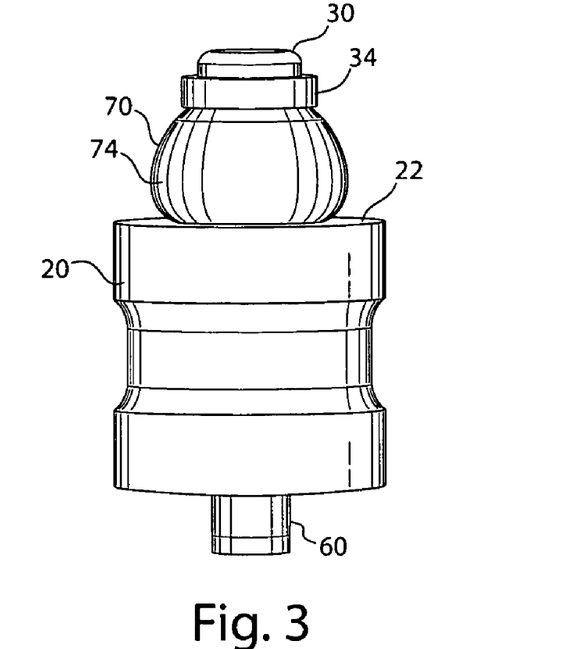
FIG. 3 is a pictorial view of the deflasher sleeve in flexed position around the upper punch.
Figure 10:
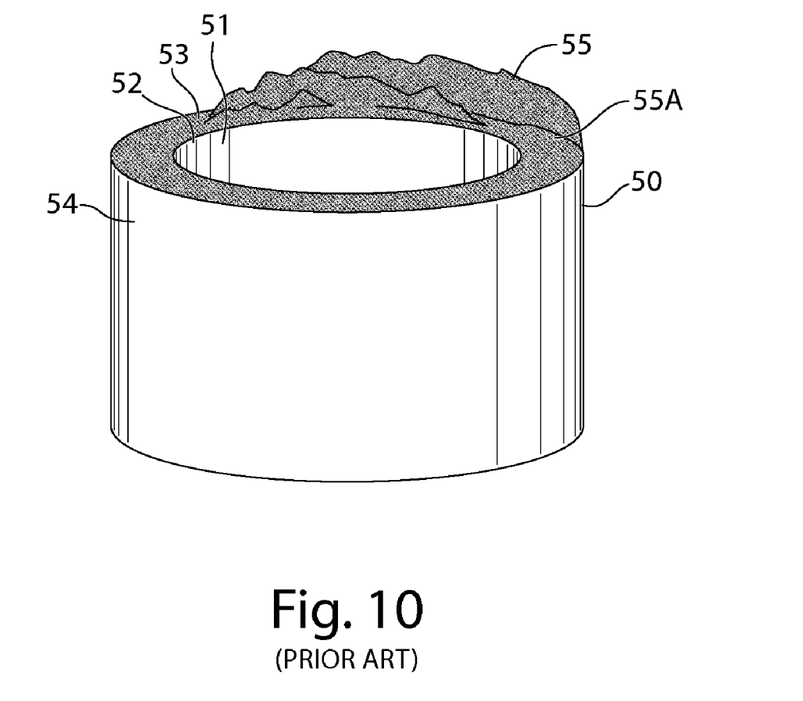
FIG. 10 is a schematic pictorial representation showing flashed cathode material attached to the upper surface of the compacted cathode disk which may occur when the deflasher sleeve as in FIG. 1 or the seal ring as in FIG. 7 are not employed.

In a preferred compaction sequence the cathode mixture 50 is first loaded into die cavity 25 (FIG. 1) while the upper punch tip 32 is extended above die table 22 (loading position not shown). Upper punch 30 is then pushed downward while lower punch 40 and core rod 60 is moved upward further into the die cavity to the position shown in FIG. 1. As the upper punch 30 is pushed downward, tip surface 32 of upper punch 30 moves down passed the die table (top surface) 22 of die 20. This causes a major portion of sleeve 70, namely its middle portion, to compress, that is, to flex and bulge outwardly as the sleeve is held in place at its upper end by upper punch head ring 34 and at its lower end by impact against die table 22 (FIGS. 1 and 3). Deflasher sleeve 70 does not enter the die cavity 25. The pressure of the lower edge of sleeve 70 against the die table 22 as upper punch 30 moves down into die 22 causes the bulging of the sleeve to occur (FIG. 3). No portion of sleeve 70 enters die cavity 25. Compaction of cathode mixture 50 occurs as the upper punch 30 continues downward movement once the lower punch 40 reaches the position shown in FIG. 1. (Compaction of cathode mixture 50 may be assisted by simultaneous continued upward movement of lower punch 40 as the upper punch 30 continues downward.) The cathode mixture 50 thus becomes compacted between tip surface 32 of upper punch 30 and tip surface 42 of lower punch 40 while the deflasher sleeve 70 is compressed, that is, becomes flexed outwardly in bulged position shown in FIGS. 1 and 3. After cathode mixture 50 has been compacted the upper punch 30 begins to retract. The deflasher sleeve 70 remains flexed and outwardly bulged as shown in FIG. 1 until the upper punch 30 is fully retracted, that is, until upper punch tip surface 32 reaches die table 22. At that point deflasher sleeve 70 reflexes to return to its original position (FIG. 2). However, while the upper punch 30 is retracting, the lower punch 40 is simultaneously moving upward to begin ejection of the compacted cathode 50 from die cavity 25. The upwards movement of lower punch 40 is timed so that the compacted cathode 50 bumps into deflasher sleeve 70 just as the deflasher sleeve 70 returns to its original reflexed, decompressed, position hugging the outer surface of upper punch 30 (FIG. 2). The point of contact occurs during ejection of cathode disk 50 just as the cathode disk outer surface 54 contacts the lower portion of sleeve 70 as shown in FIG. 2. The forced contact between compacted cathode 50 and deflasher sleeve 70, is timed to occur just before compacted cathode 50 is fully ejected from die cavity 25. This has been found to prevent formation of flashed cathode material such as the web of flashed material 55 and 55a attached to the top surface 53 cathode disk 50 as shown in FIG. 10. Such flashed material 55 and 55a may occur, that is, if sleeve 70 of the invention was not employed. Thus, the product cathode disk 50 ejected from die 25 does not exhibit flashed material 55 and 55a attached to its surfaces as in FIG. 10, but rather has even (clean) surfaces as shown in disk 50 of FIG. 11.

Figure 7:
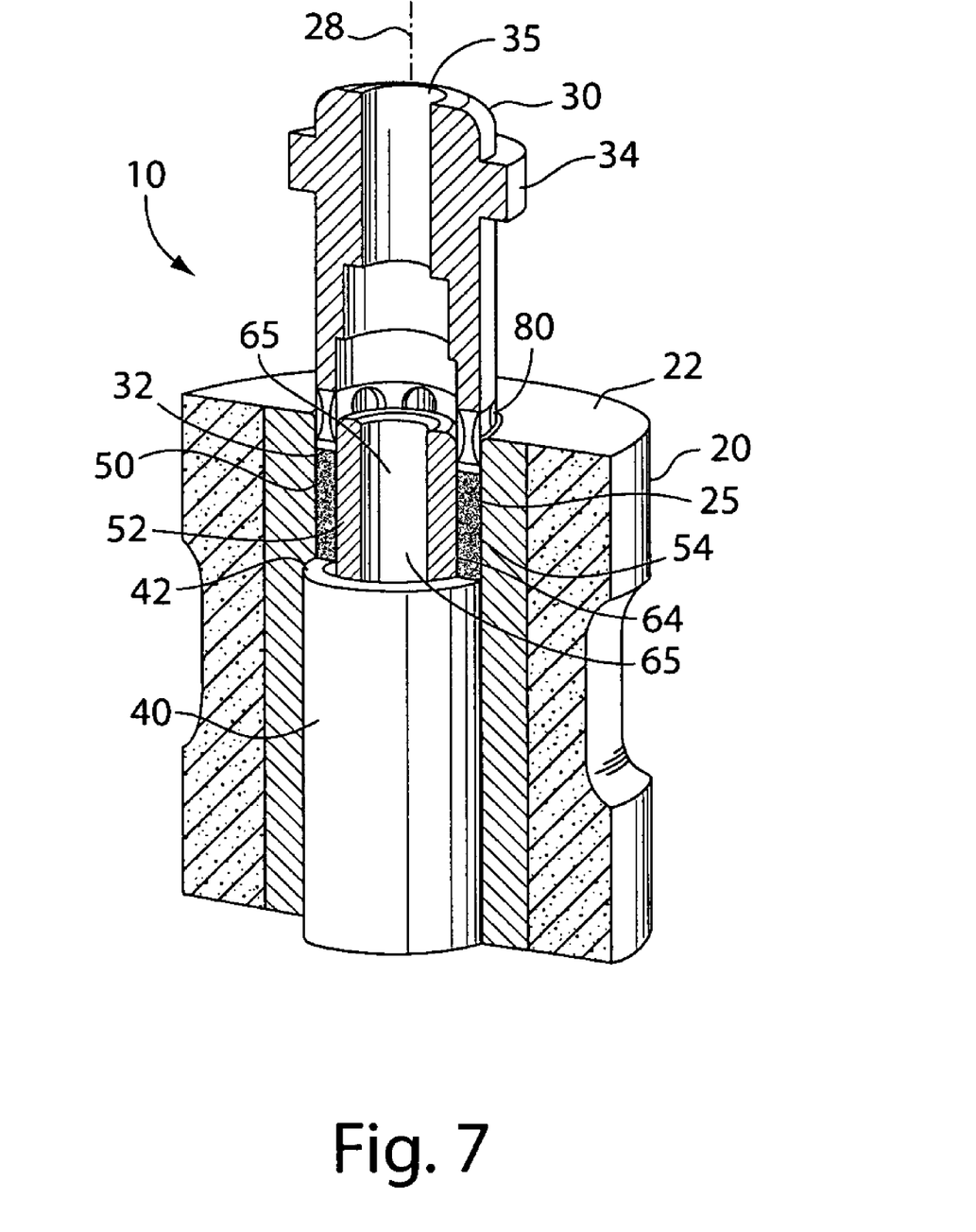
FIG. 7 is a cross sectional view of a second embodiment of the punch assembly showing a seal ring over the bottom end of the upper punch outer surface and adjacent the punch tip surface.
Figure 8:
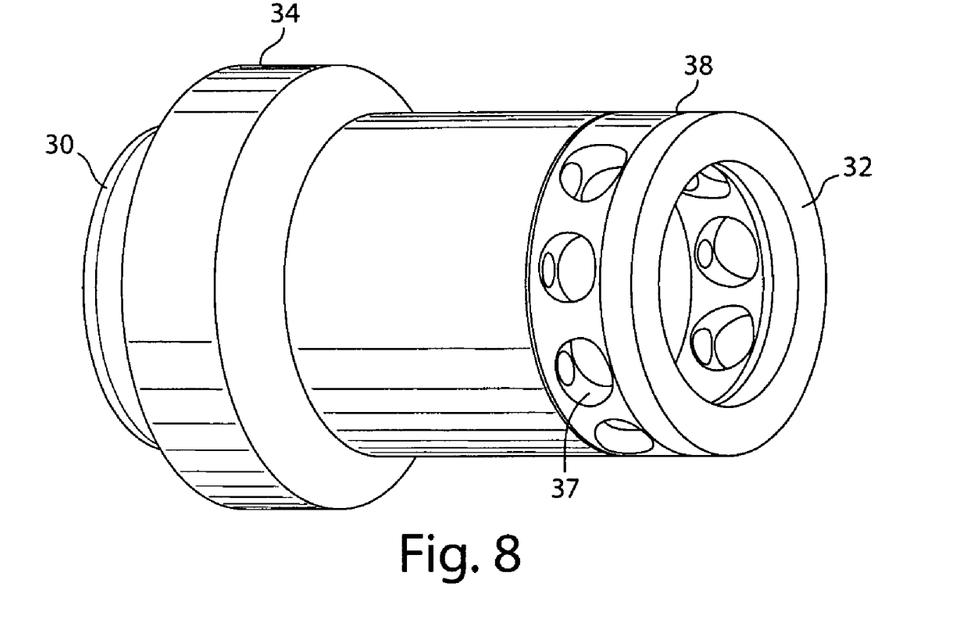
FIG. 8 is a pictorial view of the upper punch showing a plurality of apertures in the upper punch body surface adjacent the punch tip surface.
Figure 9:
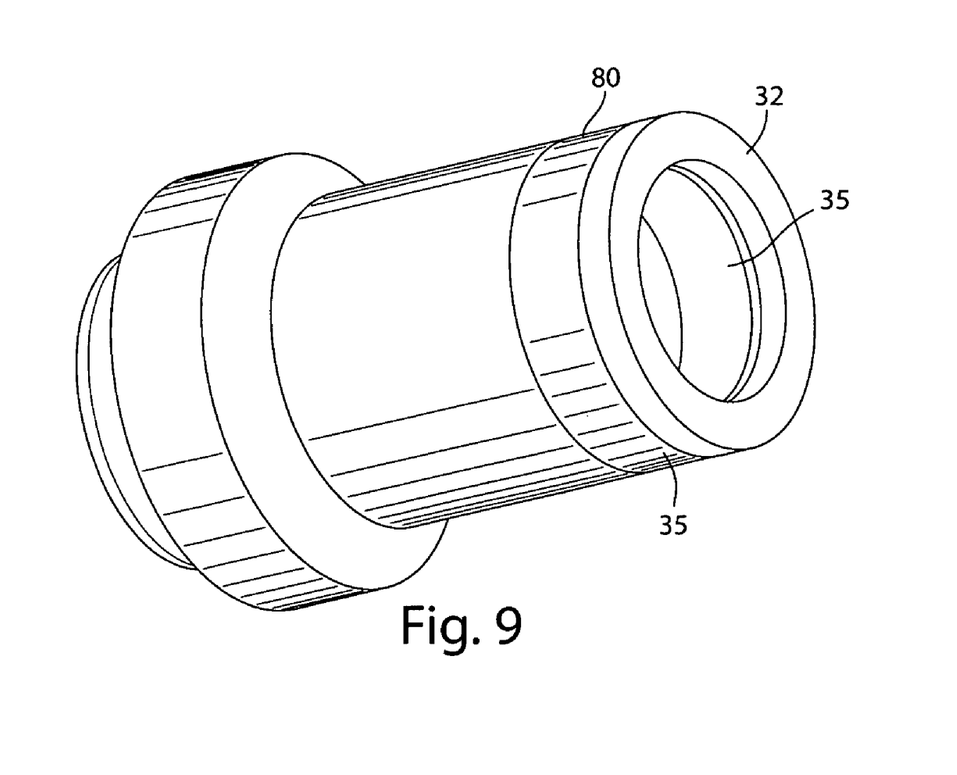
FIG. 9 is a pictorial of the upper punch showing a seal ring covering the underlying apertures shown in FIG. 8.

In another specific embodiment the representative cathode mixture 50 may be inserted into die assembly 10 (FIG. 7) to be compacted into a cathode disk 50 (FIG. 11). The die assembly 10 (FIG. 7) has die 20 with die cavity 25 therein and an elongated upper punch 30 and an elongated lower punch 40, which move within die cavity 25. There is a core rod 60 which moves within the core cavity 45 of lower punch 40. The die cavity 25, upper punch 30, lower punch 40, and core rod 60 all have common central longitudinal axis 28 (FIG. 7). The upper punch 30 and lower punch 40 are formed of high carbon steel desirably tool grade steel. Die 20 is formed preferably of ceramic material. The upper punch 30 is fitted with a seal ring 80, preferably of polyurethane material, as shown best in FIG. 9. A preferred polyurethane for seal ring 80 is available as polyester-85A polyurethane available from Parkway Products. Preferably the durometer hardness of the polyurethane seal ring 80 ranges from 20 Shore A to 70 Shore D (ASTM Standard). The seal ring 80 is preferably overmolded directly onto the upper punch outer surface at the punch lower end 38 (FIGS. 8 and 9). Seal ring 80 thus lies circumferentially flush against the outer surface of lower punch 40, thereby hugging the outer surface of said lower punch 40. The seal ring 80 is thus positioned adjacent and in close proximity to the punch tip surface 32, but does not cover tip surface 32 (FIG. 9). Preferably, a plurality of apertures 37 (FIG. 8) are formed along a circumferential path in the punch body surface and the seal ring 80 is molded directly over apertures 37, thus covering these apertures. The cathode mixture loading and compacting process employing the die assembly 10 shown in FIG. 7 is as follows:

Initially the upper punch 30 (FIG. 7) is moved upwards so that upper punch tip 32 is above die table (die top surface) 22. The cathode mixture 50 is inserted into die cavity 25 so that the mixture rests against tip surface 42 of lower punch 40. The cathode mixture 50 is thus initially held in place in die cavity 25 by lower punch tip surface 42, core rod 60 outer surface 64, and the wall surface of cavity 25. Upper punch 30, lower punch 40, and core rod 60 have independent movement, and may be moved up or down in synchronized manner. With reference to the punch assembly shown in FIG. 7 the cathode mixture is compacted by action of upper punch 30 stroking downward on cathode mixture 50 as lower punch 40 moves up into desired position as shown best in FIG. 7. Core rod 60 (FIGS. 1 and 2) may slide independently to form the cathode disk hollow core 51 shown best in FIG. 11.

In a preferred compaction sequence the cathode mixture 50 is first loaded into die cavity 25 (FIG. 7) while the upper punch tip 32 is extended above die table 22 (loading position not shown). Upper punch 30 is then pushed downward while lower punch 40 and core rod 60 is moved upward further into the die cavity to the position shown in FIG. 7. As the upper punch 30 is pushed downward, tip surface 32 of upper punch 30 moves down passed the die table (top surface) 22 of die 20. This causes at least a portion of the seal ring 80 to compress as seal ring 80 begins entry into die cavity 25 (FIG. 7). The seal ring 80, however, is molded to the outer surface of upper punch 30 at punch lower end 38 and therefore continues to hug punch 30 outer surface. Compaction of cathode mixture 50 occurs as the upper punch 30 continues downward movement once the lower punch 40 reaches the desired position, approximately as shown in FIG. 7. (Compaction of cathode mixture 50 may be assisted by simultaneous upward movement of lower punch 40 as the upper punch 30 continues downward.) During cathode compaction vertical forces on the seal ring 80 are transposed into radial forces enhancing the sealing effect of seal ring 80 as the sealing ring 80 begins to enter die cavity 25 (FIG. 7). This helps to prevent formation of flashed cathode material at this point in the compaction process. After cathode mixture 50 has been compacted the upper punch 30 begins to retract. (The seal ring 80 remains compressed until the upper punch tip surface 32 retracts to die table 22.) However, while the upper punch 30 is retracting, the lower punch 40 is simultaneously moving upward to begin the process of ejecting the compacted cathode 50. During the beginning of the ejection process, the seal ring 80 continues to form a tight plug at the entrance to cavity 25, that is, just at or immediately below die table 22. That is, as the cathode disk 50 is being ejected from die cavity 25 cathode disk 50 presses against seal ring 80, while at least a portion of seal ring 80 is still within die cavity 25. This prevents flashing of cathode material to occur or become attached to the cathode disk 50 as disk 50 is being ejected from die cavity 25. Such flashed material 55 and 55a may otherwise occur, that is, if seal ring 80 of the invention is not employed around the lower end 38 of upper punch 30. Thus, the product cathode disk 50 ejected from die 25 does not exhibit flashed material 55 and 55a attached to its surfaces as in FIG. 10, but rather has even (clean) surfaces as shown in disk 50 of FIG. 11.

Although the invention has been described with reference to specific embodiments, it should be appreciated that other embodiments are possible without departing from the concept of the invention and are thus within the claims and equivalents thereof.

What is claimed is:

1. A method of forming a compacted disk, comprising the steps of:
   a) inserting a mixture of material into a cavity running through a die casing,
   b) positioning a first plunger in alignment with said cavity so that said first plunger may engage said mixture of material when said first plunger is moved downwardly into said cavity,
   c) positioning a second plunger in alignment with said cavity so that said second plunger may engage said mixture of material when said second plunger is moved upwardly into said cavity,
   d) positioning a polymeric seal ring circumferentially around at least a portion of the outer surface of said first plunger so that said seal ring lies flush against at least a portion of the outer surface of said first plunger, wherein the first plunger has a tip surface facing said mixture of material, wherein said seal ring is positioned in proximity to said tip surface of said first plunger,
   e) moving said first plunger downwardly into said cavity so that at least a portion of said seal ring enters said cavity and said mixture of material is compacted against a portion of said second plunger thereby forming a compacted disk, wherein as the first plunger moves downwardly into said cavity to compact said mixture of material at least a portion of said seal ring enters said cavity
   f) ejecting said compacted disk from said cavity by moving said first and second plungers upwardly within said cavity, wherein as said first plunger moves upwardly to eject said compacted disk said disk presses against the seal ring, wherein the pressing of said compacted disk against and the seal ring prevents a web of flashed material from forming and from attaching to said compacted disk as said disk is being ejected from said cavity.

2. The method of claim 1 wherein at least a portion of said seal ring enters said cavity as said mixture of material is being compacted in step (d) and at least a portion of said seal ring lies within said cavity as the compacted disk is being ejected in step (e) wherein as said first plunger is moved upwardly in step (e) said compacted disk presses against said seal ring as at least a portion of said seal ring lies within said cavity as said disk is being ejected from said cavity, wherein the action of pressing said compacted disk against said seal ring prevents a web of flashed material from forming and from attaching to the compacted disk.

3. The method of claim 1 wherein said polymeric ring comprises polyurethane.

4. A method of forming a compacted cathode disk for an alkaline cell, comprising the steps of:
   a) inserting a mixture of cathode material into a cavity running through a die casing,
   b) positioning a first plunger in alignment with said cavity so that said first plunger may engage said cathode material when said first plunger is moved downwardly into said cavity,
   c) positioning a second plunger in alignment with said cavity so that said second plunger may engage said cathode material when said second plunger is moved upwardly into said cavity,
   d) positioning a polymeric seal ring circumferentially around at least a portion of the outer surface of said first plunger so that said seal ring lies flush against at least a portion of the outer surface of said first plunger, wherein the first plunger has a tip surface facing the cathode material, wherein said seal ring is positioned in proximity to said tip surface of said first plunger,
   e) moving said first plunger downwardly into said cavity so that at least a portion of said seal ring enters said cavity and the cathode material is compacted against a portion of said second plunger thereby forming a compacted cathode disk, wherein as the first plunger moves downwardly into said cavity to compact the cathode material at least a portion of said seal ring enters said cavity
   f) ejecting said compacted cathode disk from said cavity by moving said first and second plungers upwardly within said cavity, wherein as said first plunger moves upwardly to eject said compacted cathode disk said disk presses against the seal ring, wherein the pressing of said compacted cathode disk against and the seal ring prevents a web of flashed cathode material from forming and from attaching to said compacted cathode disk as said disk is being ejected from said cavity.

5. The method of claim 4 wherein said first and second plungers each have a tip surface, wherein each of said tip surfaces contact said cathode material as said cathode material is being compacted in step (e).

6. The method claim 5 wherein said first and second plunger tip surfaces each form a flat annular surface.

7. The method of claim 4 wherein a rod passes through the center of said cathode material as said cathode material is being compacted in step (e).

8. The method of claim 4 wherein a portion of said seal ring enters said cavity as the cathode material is being compacted in step (e) and at least a portion of the seal ring lies within said cavity as said compacted disk presses against said seal ring as said compacted disk is being ejected from said cavity in step (f).

9. The method of claim 4 wherein said seal ring is molded to the outer surface of said first plunger.

10. The method of claim 4 wherein said seal ring comprises polyurethane material.

11. The method of claim 4 wherein said die casing comprises ceramic material.

12. The method of claim 4 wherein said first and second plungers each have a cylindrical outer surface and said first and second plungers are each of steel.

13. The method of claim 7 wherein said first and second plungers each have an elongated housing having an elongated hollow core running there through and said rod passes through said hollow core of at least one of said first and second plungers as the cathode material is being compacted in step (e).

14. The method of claim 4 wherein said cathode material comprises manganese dioxide.

* * * * *